US012307984B2

(12) United States Patent
Kuo et al.

(10) Patent No.: US 12,307,984 B2
(45) Date of Patent: May 20, 2025

(54) MODULATING DEVICE

(71) Applicant: Innolux Corporation, Miaoli County (TW)

(72) Inventors: Kung-Chen Kuo, Miaoli County (TW); Yi-Hung Lin, Miaoli County (TW); Po-Syun Chen, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/465,156

(22) Filed: Sep. 11, 2023

(65) Prior Publication Data

US 2024/0119909 A1 Apr. 11, 2024

Related U.S. Application Data

(60) Provisional application No. 63/425,314, filed on Nov. 15, 2022, provisional application No. 63/413,972, filed on Oct. 7, 2022.

(30) Foreign Application Priority Data

Jul. 19, 2023 (CN) ......................... 202310889089.0

(51) Int. Cl.
*G09G 3/34* (2006.01)

(52) U.S. Cl.
CPC ... *G09G 3/3406* (2013.01); *G09G 2300/0819* (2013.01); *G09G 2300/0828* (2013.01); *G09G 2300/0842* (2013.01)

(58) Field of Classification Search
CPC ......... G09G 3/3406; G09G 2300/0819; G09G 2300/0828; G09G 2300/0842
See application file for complete search history.

(56) References Cited

U.S. PATENT DOCUMENTS

2013/0033475 A1* 2/2013 Miyake .................... G09G 5/00 345/211
2023/0089957 A1* 3/2023 Charisoulis .............. G09G 3/32 257/79
2023/0170900 A1* 6/2023 Hashimoto .............. G09G 3/32 345/204

* cited by examiner

*Primary Examiner* — Peter D McLoone
(74) *Attorney, Agent, or Firm* — JCIPRNET

(57) ABSTRACT

A modulating device is provided. The modulating device includes multiple modulating elements, multiple pixel circuits, and a compensation circuit. The pixel circuits are electrically connected to the modulating elements correspondingly. The compensation circuit includes a driving unit, a voltage source, and a current source. The driving unit provides a driving signal to the pixel circuits. The voltage source is electrically connected to the driving unit. The voltage source provides a constant voltage to the pixel circuits. The current source is electrically connected to the driving unit. The current source provides a constant current to the pixel circuits.

19 Claims, 9 Drawing Sheets

200

MODULATING DEVICE

CROSS-REFERENCE TO RELATED APPLICATION

This application claims the priority benefit of U.S. provisional application Ser. No. 63/413,972, filed on Oct. 7, 2022, U.S. provisional application Ser. No. 63/425,314, filed on Nov. 15, 2022, and China application serial no. 202310889089.0, filed on Jul. 19, 2023. The entirety of each of the above-mentioned patent applications is hereby incorporated by reference herein and made a part of this specification.

BACKGROUND

Technical Field

The disclosure relates to an electronic device, and more particularly, to a modulating device.

Description of Related Art

A modulating device includes multiple modulating elements and multiple pixel circuits. The pixel circuits control an operation of the modulating elements, thereby modulating an external signal received by the modulating device.

However, based on a manufacturing process, electronic properties of the modulating elements disposed in the modulating device may not be completely the same. In a case that the electronic properties of the modulating elements are not completely the same, based on the same driving signal (such as a driving voltage or a driving current), the operation of the modulating elements are also not completely the same. Therefore, how to enable the operation of the modulating elements to be substantially the same based on the driving signal is one of the research focuses of those skilled in the art.

SUMMARY

The disclosure relates to a modulating device that may obtain electronic properties of a modulating element and compensate operation parameters based on the electronic properties.

According to an embodiment of the disclosure, a modulating device includes a main substrate, multiple modulating elements, multiple pixel circuits, and a compensation circuit. The main substrate has a first surface. The first surface includes an actuation region. The modulating elements are disposed in the actuation region. The pixel circuits are disposed in the actuation region, and are electrically connected to the modulating elements correspondingly. The compensation circuit is electrically connected to the pixel circuits. The compensation circuit includes a driving unit, a voltage source, and a current source. The driving unit provides a driving signal to the pixel circuits. The voltage source is electrically connected to the driving unit. The voltage source provides a constant voltage to the pixel circuits. The current source is electrically connected to the driving unit. The current source provides a constant current to the pixel circuits.

In order for the aforementioned content of the disclosure to be more comprehensible, embodiments accompanied with drawings are described in detail below.

DETAILED DESCRIPTION OF DISCLOSED EMBODIMENTS

Figure 1:
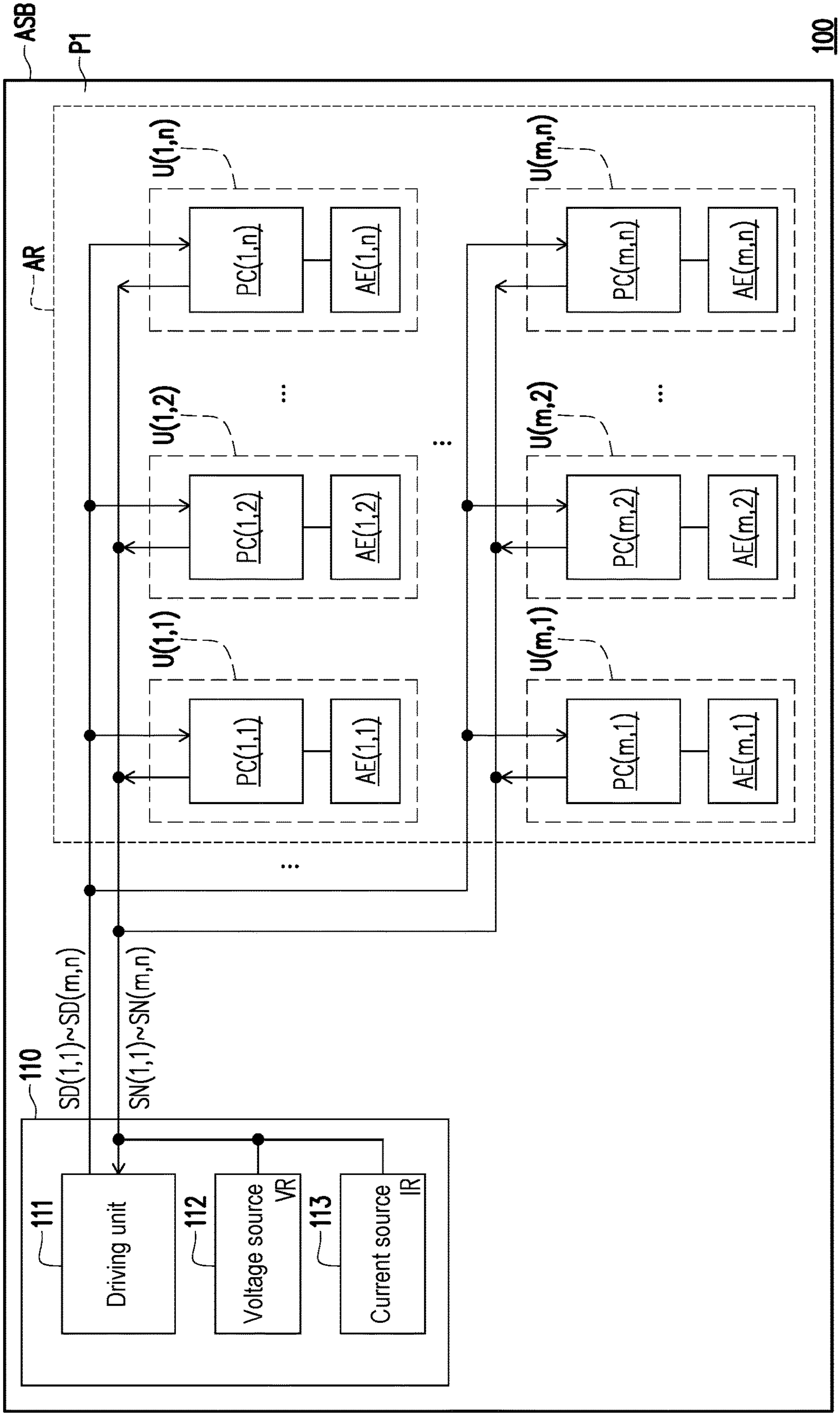
FIG. 1 is a schematic diagram of a modulating device according to the first embodiment of the disclosure.

The disclosure may be understood by referring to the following detailed description taken in conjunction with the drawings as described below. It should be noted that, for the purpose of clarity and ease of understanding for the reader, the various figures of the disclosure depict a portion of an electronic device, and some elements in the various figures may not be drawn to scale. Furthermore, the number and size of each device shown in the figures are illustrative only and are not intended to limit the scope of the disclosure.

Certain terms are used throughout the description and the following claims to refer to specific elements. As will be understood by those skilled in the art, electronic device manufacturers may refer to elements by different names. This specification does not intend to distinguish between elements that differ by name but not function. In the following description and in the claims, the terms "comprise," "include," and "have" are used in an open manner, and should therefore be interpreted to mean "include but not limited to . . . ". Therefore, when the terms "comprise", "include" and/or "have" are used in the description of the disclosure, it indicates existence of corresponding features, regions, steps, operations and/or elements, but is not limited to existence of one or more corresponding features, regions, steps, operations and/or elements.

It should be understood that when an element is referred to as being "coupled", "connected" or "conductive" to another element, the element may be directly connected to another element to directly establish an electrical connection, or there may be an intermediate element between these elements for relaying the electrical connection (indirect electrical connection). In contrast, when an element is referred to as being "directly coupled", "directly conductive" or "directly connected" to another element, there is no intermediate element there between.

Although terms such as "first", "second", "third", etc., may be used to describe various constituent elements, such constituent elements are not limited by these terms. The terms are only used to distinguish constituent elements in the specification from other constituent elements. The claims may not use the same terms, but may use the terms "first", "second", "third", etc., relative to a claimed order of the elements. Therefore, in the following description, the first constituent element may be the second constituent element in the claims.

An electronic device in the disclosure may include a display device, an antenna device, a reconfigurable intelligent surface device (RIS), a signal feeding device, a waveguide device, a sensing device, a light emitting device, a touch display, a curved device, or a free shape display, but the disclosure is limited thereto. The electronic device may include a bendable or flexible electronic device. The electronic device may, for example, include liquid crystals, light emitting diodes, quantum dots (QDs), fluorescence, phosphors, other suitable display media, or a combination thereof, but the disclosure is not limited thereto. The light emitting diodes may, for example, include organic light emitting diodes (OLEDs), mini LEDs, micro LEDs, or quantum dot LEDs (which may include QLEDs, QDLEDs), or other suitable materials, or a combination thereof, but the disclosure is not limited thereto. The display device may include, for example, a tiled display device, but the disclosure is not limited thereto. The antenna device may be, for example, a liquid crystal antenna, but the disclosure is not limited thereto. The antenna device may include, for example, an antenna tiling device, but the disclosure is not limited thereto. It should be noted that, the electronic device may be any arrangement and combination of the foregoing, but the disclosure is not limited thereto. In addition, a shape of the electronic device may be rectangular, circular, polygonal, a shape with curved edges, or other suitable shapes. The electronic device may have peripheral systems such as a driving system, a control system, a light source system, etc., to support the display device, the antenna device or the tiling device, but the disclosure is not limited thereto. The sensing device may include a camera, an infrared sensor or a fingerprint sensor, etc., but the disclosure is not limited thereto. In some embodiments, the sensing device may further include a flash lamp, an infrared (IR) light source, other sensors, electronic components, or a combination thereof, but the disclosure is not limited thereto.

In the disclosure, the embodiments use a “pixel” or “pixel unit” as a unit for describing a specific region containing at least one functional circuit for at least one specific function. The region of a “pixel” depends on the unit used to provide the specific function, and adjacent pixels may share same portions or wires, but may also include specific portions of themselves therein. For example, the adjacent pixels may share the same scan lines or the same data lines, but the pixels may also have their own transistors or capacitors.

It should be noted that the technical features in the different embodiments described below may be replaced, recombined or mixed with each other to constitute another embodiment without departing from the spirit of the disclosure.

Referring to FIG. 1, FIG. 1 is a schematic diagram of a modulating device according to the first embodiment of the disclosure. In this embodiment, a modulating device 100 includes a main substrate ASB, modulating elements AE(1, 1) to AE(m, n), pixel circuits PC(1, 1) to PC(m, n), and a compensation circuit 110. The modulating device 100 may be, for example, technologies used in the field of communication, radar/lidar, or other suitable fields, but the disclosure is not limited thereto. The modulating elements AE(1, 1) to AE(m, n) may include varactor diodes, variable capacitors, variable resistors, phase shifters, amplifiers, biometric sensors, graphene sensors, other suitable elements, or a combination of the above, but the disclosure is not limited thereto. The main substrate ASB has a first surface P1. The first surface P1 includes an actuation region AR. The modulating elements AE(1, 1) to AE(m, n) are disposed in the actuation region AR. The pixel circuits PC(1, 1) to PC(m, n) are disposed in the actuation region AR, and are electrically connected to the modulating elements AE(1, 1) to AE(m, n) correspondingly. Taking this embodiment as an example, the pixel circuits PC(1, 1) to PC(m, n) are electrically connected to the modulating elements AE(1, 1) to AE(m, n) correspondingly in a one-to-one manner. However, the disclosure is not limited thereto. The pixel circuit PC(1, 1) is electrically connected to the modulating element AE(1, 1). The pixel circuit PC(1, 2) is electrically connected to the modulating element AE(1, 2), and the rest may be derived by analog. Taking this embodiment as an example, the pixel circuit PC(1, 1) and the modulating element AE(1, 1) may jointly form a modulating unit U(1, 1). The pixel circuit PC(1, 2) and the modulating element AE(1, 2) may jointly form a modulating unit U(1, 2), and the rest may be derived by analog. Modulating units U(1, 1) to U(m, n) are arranged in multiple rows and columns, for example. However, the disclosure is not limited to the arrangement of the modulating units U(1, 1) to U(m, n).

In this embodiment, the compensation circuit 110 is electrically connected to the pixel circuits PC(1, 1) to PC(m, n). The compensation circuit 110 includes a driving unit 111, a voltage source 112, and a current source 113. The driving unit 111 provides driving signals SD(1, 1) to SD(m, n) to the pixel circuits PC(1,1) to PC(m, n). For example, the driving unit 111 provides the driving signal SD(1, 1) to the pixel circuit PC(1, 1). The driving unit 111 provides the driving signal SD(1, 2) to the pixel circuit PC(1, 2), and the rest may be derived by analog. The voltage source 112 is electrically connected to the driving unit 111. The voltage source 112 provides a constant voltage VR to the pixel circuits PC(1, 1) to PC(m, n). The current source 113 is electrically connected to the driving unit 111. The current source 113 provides a constant current IR to the pixel circuits PC(1, 1) to PC(m, n).

Further, the driving unit 111 provides at least one of the constant voltage VR and the constant current IR by the voltage source 112 to operate the pixel circuits PC(1, 1) to PC(m, n). The pixel circuits PC(1, 1) to PC(m, n) respectively provide detection signals SN(1, 1) to SN(m, n) based on at least one of the constant voltage VR and the constant current IR. The driving unit 111 compensates the driving signals SD(1, 1) to SD(m, n) according to the detection signals SN(1, 1) to SN(m, n). The detection signals SN(1, 1) to SN(m, n) are associated with electronic properties of the pixel circuits PC(1, 1) to PC(m, n) and electronic properties of the modulating elements AE(1, 1) to AE(m, n). In other words, the driving unit 111 compensates the driving signal SD(1, 1) according to the electronic property of the pixel circuit PC(1, 1) and the electronic property of the modulating element AE(1, 1). The driving unit 111 compensates the driving signal SD(1, 2) according to the electronic property of the pixel circuit PC(1, 2) and the electronic property of the modulating element AE(1, 2), and the rest may be derived by analog.

Generally speaking, the pixel circuits PC(1, 1) to PC(m, n) and the modulating elements AE(1, 1) to AE(m, n) are assembled on the main substrate ASB. Based on a manufacturing process and manufacturing batches, the electronic properties of the pixel circuits PC(1, 1) to PC(m, n) may be different. In addition, the electronic properties of the modulating elements AE(1, 1) to AE(m, n) may be different. It is worth mentioning here that the driving unit 111 compensates the drive signals SD(1, 1) to SD(m, n) according to the electronic properties of the pixel circuits PC(1, 1) to PC(m, n) and the electronic properties of the modulating elements AE(1, 1) to AE(m, n). Based on the above compensation, a difference in the electronic properties may be eliminated. Operation performance of the modulating elements AE(1, 1)

to AE(m, n) may be more consistent. In this way, operation uniformity of the modulating elements AE(1, 1) to AE(m, n) may be improved.

In this embodiment, the compensation circuit 110 is disposed on the first surface P1 and outside the actuation region AR. The compensation circuit 110 is, for example, disposed in a peripheral region outside the actuation region AR.

Figure 2:
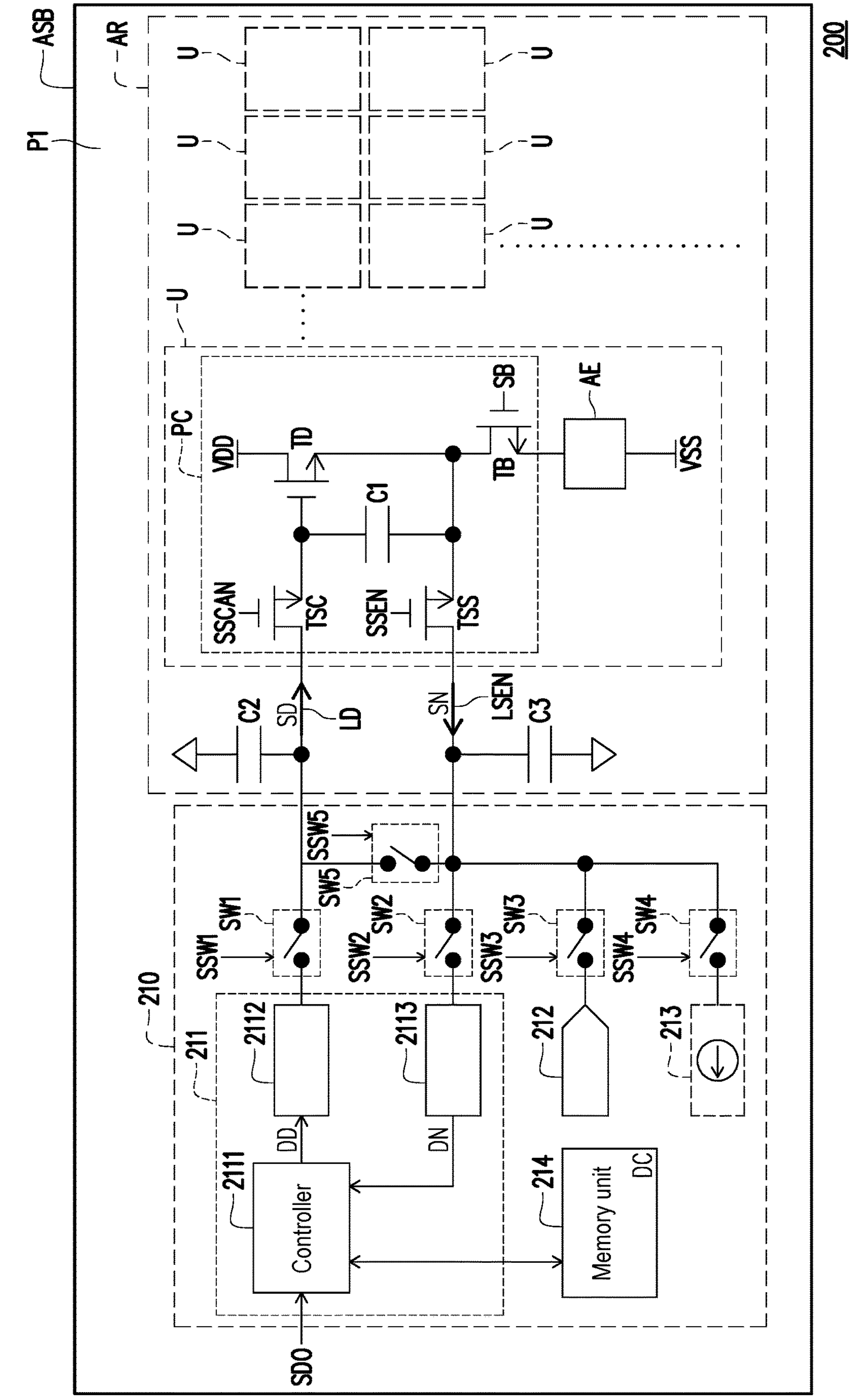
FIG. 2 is a schematic diagram of a modulating device according to the second embodiment of the disclosure.

Referring to FIG. 2, FIG. 2 is a schematic diagram of a modulating device according to the second embodiment of the disclosure. In this embodiment, a modulating device 200 includes the main substrate ASB, multiple modulating units U, and a compensation circuit 210. The compensation circuit 210 includes a driving unit 211, a voltage source 212, a current source 213, and a memory unit 214. One of the modulating units U includes a modulating element AE (i.e., a first modulating element) and a pixel circuit PC (i.e., a first pixel circuit). The pixel circuit PC is electrically connected to the modulating element AE. In this embodiment, a first end of the modulating element AE is electrically connected to the pixel circuit PC. A second end of the modulating element AE is electrically connected to a reference low voltage value VSS. The modulating element AE is implemented by, for example, a varactor (or called a varactor diode), but the disclosure is not limited thereto. Therefore, the first end of the modulating element AE is a cathode (or called a negative pole). The second end of the modulating element AE is an anode (or called a positive pole).

In some embodiments, the modulating element AE may be a variable inductor or a variable resistor. In some embodiments, the modulating element AE may be based on a voltage-controlled element. A parameter of the modulating element AE (e.g., at least one of a capacitance value, an inductance value, and a resistance value) may be changed in response to a voltage value. In some embodiments, the modulating element AE may be based on a current-controlled element. The parameter of the modulating element AE may be changed in response to a current value.

In this embodiment, the pixel circuit PC includes a first transistor TD, a second transistor TSC, a third transistor TSS, a fourth transistor TB, and a first capacitor C1. A first end of the first transistor TD is electrically connected to a reference high voltage value VDD. A first end of the second transistor TSC is electrically connected to the driving unit 211. A second end of the second transistor TSC is electrically connected to a control end of the first transistor TD. A control end of the second transistor TSC receives a scanning signal S SCAN. A first end of the third transistor TSS is electrically connected to the driving unit 211. A second end of the third transistor TSS is electrically connected to a second end of the first transistor TD. A control end of the third transistor TSS receives a sensing control signal SSEN. A first end of the fourth transistor TB is electrically connected to the second end of the first transistor TD. A second end of the fourth transistor TB is electrically connected to the modulating element AE. A control end of the fourth transistor TB receives a bias signal SB. In addition, the first capacitor C1 is electrically connected between the second end of the second transistor TSC and the second end of the third transistor TSS.

Further, the first end of the second transistor TSC is electrically connected to the driving unit 211 through a data line LD. The first end of the third transistor TSS is electrically connected to the driving unit 211 through a sensing line LSEN.

In this embodiment, the modulating device 200 further includes a second capacitor C2 and a third capacitor C3. The second capacitor C2 is disposed on the main substrate ASB. The second capacitor C2 is electrically connected to the first end of the second transistor TSC through the data line LD. The third capacitor C3 is disposed on the main substrate ASB. The third capacitor C3 is electrically connected to the first end of the third transistor TSS through the sensing line LSEN. The second capacitor C2 is, for example, electrically connected between the data line LD and the reference low voltage value VSS. The third capacitor C3 is, for example, electrically connected between the sensing line LSEN and the reference low voltage value VSS. In this embodiment, the second capacitor C2 and the third capacitor C3 are disposed in the actuation region AR of the first surface P1. In some embodiments, the second capacitor C2 and the third capacitor C3 may be disposed outside the actuation region AR.

In this embodiment, the compensation circuit 210 is electrically connected to the pixel circuit PC through the data line LD and the sensing line LSEN. The driving unit 211 includes a controller 2111, a first conversion circuit 2112, and a second conversion circuit 2113. An input end of the first conversion circuit 2112 is electrically connected to the controller 2111. An output end of the first conversion circuit 2112 is electrically connected to the first end of the second transistor TSC through the data line LD. An output end of the second conversion circuit 2113 is electrically connected to the controller 2111. An input end of the second conversion circuit 2113 is electrically connected to the first end of the third transistor TSS through the sensing line LSEN.

The memory unit 214 is electrically connected to the controller 2111. In this embodiment, the compensation circuit 210 may obtain compensation data DC associated with electronic properties of the modulating element AE and/or electronic properties of the pixel circuit PC in a detection phase.

In the detection stage, the second conversion circuit 2113 receives a detection signal SN through the sensing line LSEN, converts the detection signal SN into detection data DN, and provides the detection data DN to the controller 2111. The detection signal SN is a detection result associated with the electronic properties of the modulating element AE and/or the electronic properties of the pixel circuit PC. The detection signal SN is an analog signal. The detection data DN is a digital signal. Therefore, the second conversion circuit 2113 may be implemented by an analog-to-digital converter (ADC). The controller 2111 receives the detection data DN, generates the compensation data DC according to the detection data DN, and stores the compensation data DC into the memory unit 214. In this embodiment, the modulating device 200 may perform the detection phase when it is turned on or restarted.

In an operation phase, the controller 2111 receives an operating signal SDO, and generates driving data DD according to the operating signal SDO. In addition, the memory unit 214 provides the previously stored compensation data DC to the controller 2111. Therefore, the controller 2111 may compensate the driving data DD by the compensation data DC. The driving data DD may be a digital signal. The first conversion circuit 2112 converts the driving data DD into a driving signal SD, and provides the driving signal SD to the data line LD. The driving signal SD is an analog signal. Therefore, the first conversion circuit 2112 may be implemented by a digital-to-analog converter (DAC). When the second transistor TSC is turned on in response to the scanning signal SSCAN, the pixel circuit PC receives the driving signal SD, and drives the modulating element AE in response to the driving signal SD.

In this embodiment, the voltage source 212 and the current source 213 are electrically connected to the second conversion circuit 2113 and the sensing line LSEN respectively. The voltage source 212 provides the constant voltage VR to the sensing line LSEN during the detection phase. The current source 213 provides the constant current IR to the sensing line LSEN during the detection phase.

In this embodiment, the compensation circuit 210 further includes switches SW1 to SW5. A first end of the switch SW1 is electrically connected to the output end of the first conversion circuit 2112. A second end of the switch SW1 is electrically connected to the data line LD. A control end of the switch SW1 receives a switch signal SSW1. A first end of the switch SW2 is electrically connected to the input end of the second conversion circuit 2113. A second end of the switch SW2 is electrically connected to the sensing line LSEN. A control end of the switch SW2 receives a switch signal SSW2.

In some embodiments, the switch SW1 may be disposed in the first conversion circuit 2112. In some embodiments, the switch SW2 may be disposed in the second conversion circuit 2113.

In this embodiment, a first end of the switch SW3 is electrically connected to an output end of the voltage source 212. A second end of the switch SW3 is electrically connected to the sensing line LSEN. A control end of the switch SW3 receives a switch signal SSW3. A first end of the switch SW4 is electrically connected to an output end of the current source 213. A second end of the switch SW4 is electrically connected to the sensing line LSEN. A control end of the switch SW4 receives a switch signal SSW4.

In some embodiments, the switch SW3 may be disposed in the voltage source 212. In some embodiments, the switch SW4 may be disposed in the current source 213.

In this embodiment, a first end of the switch SW5 is electrically connected to the data line LD. A second end of the switch SW5 is electrically connected to the sensing line LSEN. A control end of the switch SW5 receives a switch signal SSW5.

In this embodiment, the first transistor TD, the second transistor TSC, the third transistor TSS, and the fourth transistor TB are respectively implemented by N-type field effect transistors. Further, the first transistor TD, the second transistor TSC, the third transistor TSS, and the fourth transistor TB are respectively implemented by N-type thin film transistors (TFT). However, the disclosure is not limited thereto. The first transistor TD, the second transistor TSC, the third transistor TSS, and the fourth transistor TB are respectively implemented by any suitable transistor.

In this embodiment, the switches SW1 to SW5 may be implemented by at least one transistor respectively. In the detection phase, timing of the scanning signal SSCAN, the sensing control signal SSEN, the bias signal SB, and the switch signals SSW1 to SSW5 may be determined by the controller 2111.

In this embodiment, the memory unit 214 may be implemented by any type of programmable memory element known to those skilled in the art. The memory unit 214 is, for example, a random access memory (RAM), a flash memory, or an erasable programmable read only memory (EPROM).

Figure 3:
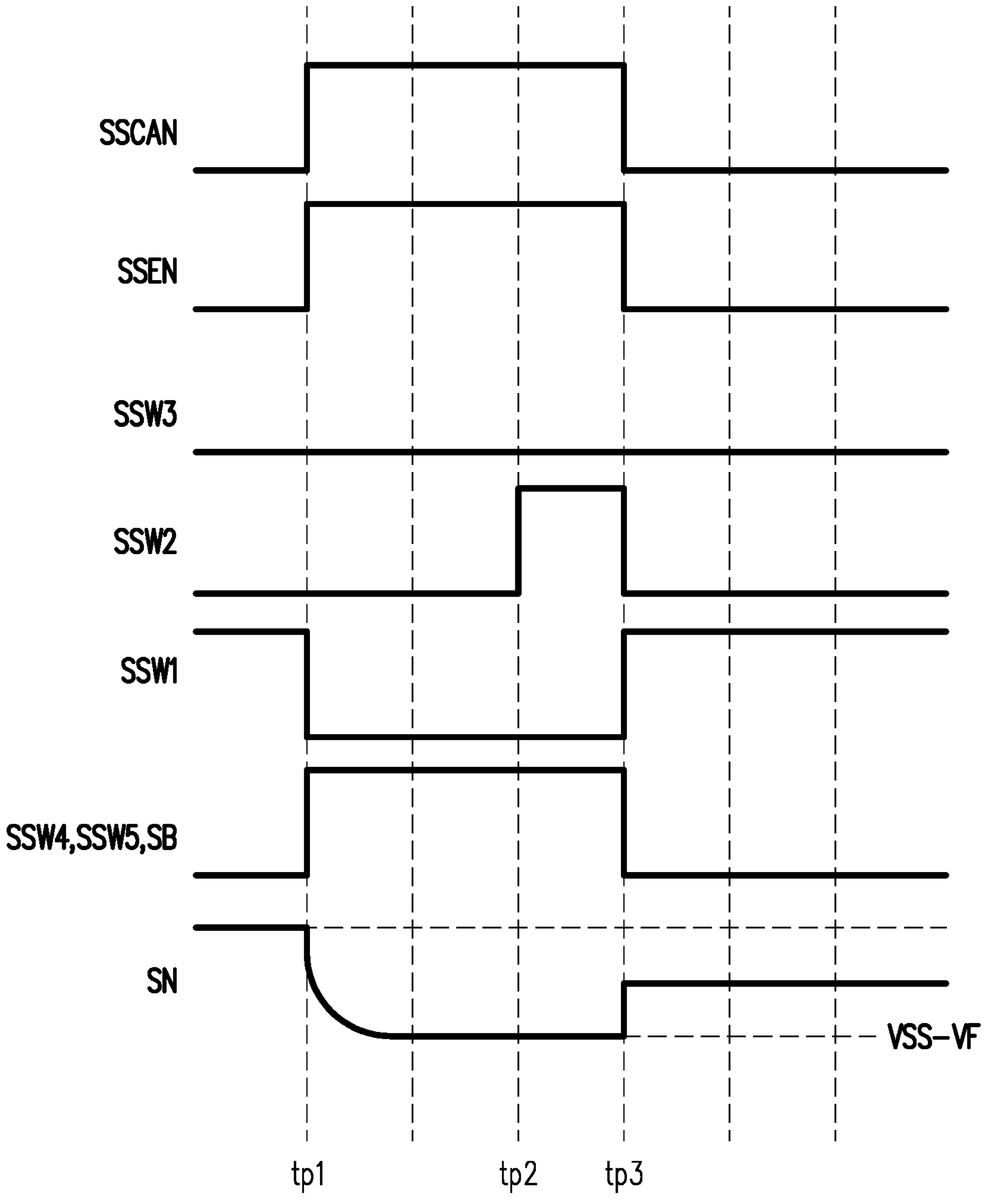
FIG. 3 is a timing diagram of a first operation in a detection phase according to FIG. 2.

Referring to both FIG. 2 and FIG. 3, FIG. 3 is a timing diagram of a first operation in a detection phase according to FIG. 2. This embodiment is suitable for obtaining a forward bias value VF of the modulating element AE.

In this embodiment, the detection phase starts at a time point tp1. At the time point tp1, voltage values of the scanning signal SSCAN, the sensing control signal SSEN, the bias signal SB, and the switch signals SSW4 and SSW5 are high voltage values. Therefore, the second transistor TSC, the third transistor TSS, the fourth transistor TB, and the switches SW4 and SW5 are all turned on. Voltage values of the switch signals SSW1 to SSW3 are low voltage values. Therefore, the switches SW1 to SW3 are all turned off. The voltage value at the control end of the first transistor TD is equal to the voltage value at the second end of the first transistor TD. Therefore, the first transistor TD is turned off.

It should be noted that a direction of the constant current IR is from the sensing line LSEN to the current source 213. The modulating element AE, the third transistor TSS, the switch SW4, and the current source 213 form a discharge path. Therefore, the voltage value at the sensing line LSEN is discharged based on the constant current IR. A voltage value of the detection signal SN is equal to a voltage difference (i.e., VSS−VF) of the reference low voltage value VSS minus the forward bias value VF.

At a time point tp2, the voltage value of the switch signal SSW2 is the high voltage value. The switch SW2 is turned on at the time point tp2. Therefore, the second conversion circuit 2113 receives the detection signal SN through the sensing line LSEN and the switch SW2, and converts the detection signal SN into the detection data DN.

At a time point tp3, the voltage values of the scanning signal SSCAN, the sensing control signal SSEN, the bias signal SB, and the switch signals SSW2, SSW4, and SSW5 are converted to the low voltage values. Therefore, the second transistor TSC, the third transistor TSS, the fourth transistor TB, the switches SW2, SW4, and SW5 are all turned off. The detection phase ends.

The controller 2111 receives the detection data DN. The reference low voltage value VSS is known. Therefore, the controller 2111 may obtain the forward bias value VF of the modulating element AE according to the detection data DN and the reference low voltage value VSS, and generate the compensation data DC according to the forward bias value VF of the modulating element AE.

For example, when the forward bias value VF is larger, the controller 2111 will use the compensation data DC to increase a value of the driving data DD. Therefore, a voltage value of the driving signal SD will be increased. When the forward bias value VF is smaller, the controller 2111 uses the compensation data DC to reduce the value of the driving data DD. Therefore, the voltage value of the driving signal SD will be reduced.

Figure 4:
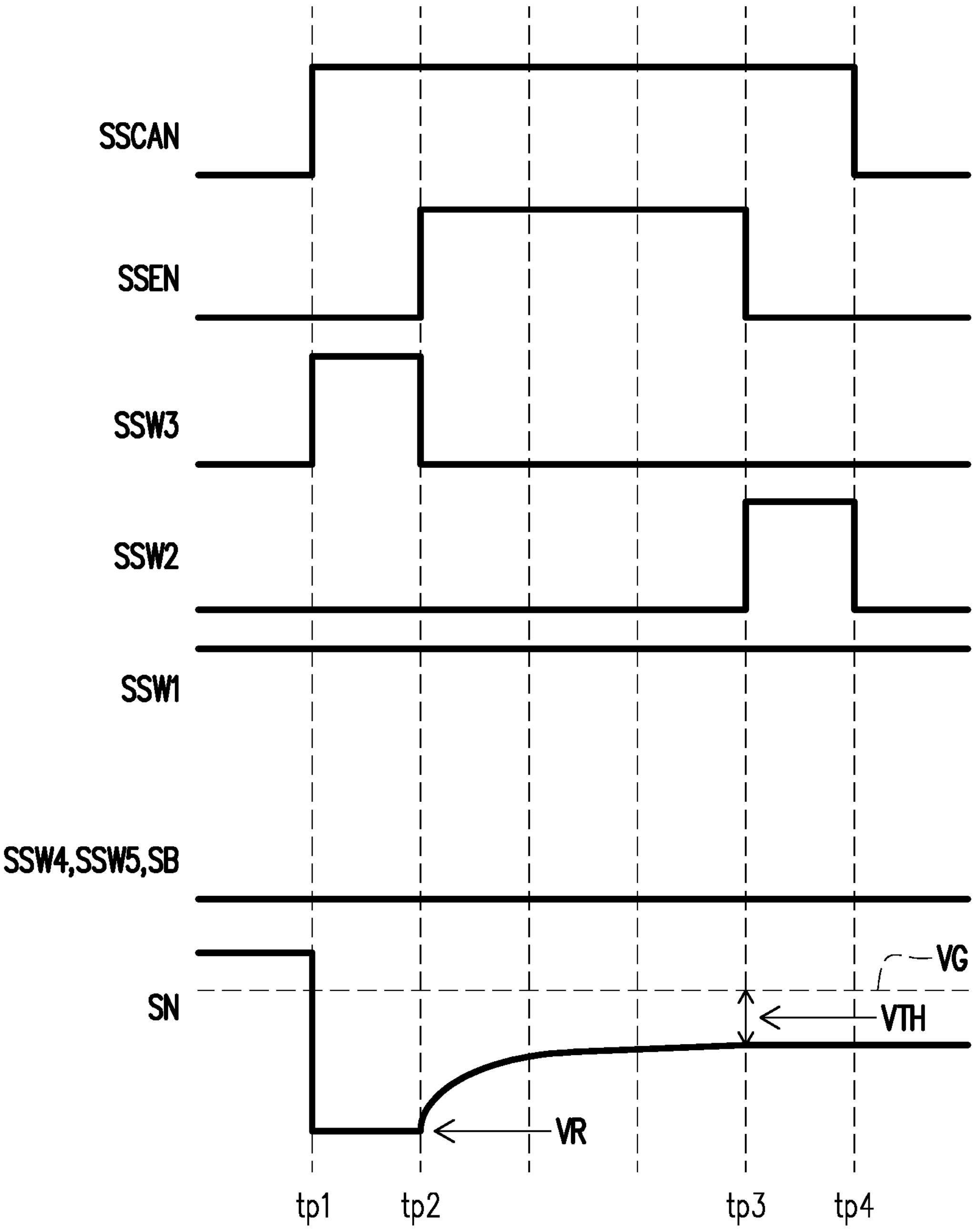
FIG. 4 is a timing diagram of a second operation in the detection phase according to FIG. 2.

Referring to both FIG. 2 and FIG. 4, FIG. 4 is a timing diagram of a second operation in the detection phase according to FIG. 2. This embodiment is suitable for obtaining a threshold voltage value VTH of the first transistor TD.

In this embodiment, the detection phase starts at the time point tp1. At the time point tp1, the voltage values of the scanning signal SSCAN and the switch signals SSW1 and SSW3 are the high voltage values. Therefore, the second transistor TSC and the switches SW1 and SW3 are all turned on. The voltage values of the sensing control signal SSEN, the switch signals SSW2, SSW4, and SSW5, and the bias signal SB are the low voltage values. The third transistor TSS, the switches SW2, SW4, and SW5, and the fourth transistor TB are all turned off. At this time, the first conversion circuit 2112 precharges the control end of the first transistor TD. The first conversion circuit 2112 precharges the voltage value at the control end of the first transistor TD to a voltage value VG. The voltage source 212 provides the constant voltage VR to the sensing line LSEN. Therefore, the voltage value at the sensing line LSEN is substantially equal to a voltage value of the constant voltage VR. In other words, at the time point tp1, the voltage value of the detection signal SN is substantially equal to the voltage value of the constant voltage VR. At the time point tp1, the voltage value of the detection signal SN is significantly lower than the voltage value at the control end of the first transistor TD.

At the time point tp2, the voltage value of the switch signal SSW3 is the low voltage value. The switch SW3 is turned off. The voltage value of the sensing control signal SSEN is the high voltage value. The third transistor TSS is turned on. The second end of the first transistor TD is electrically connected to the sensing line LSEN. At this time, the first transistor TD is turned on. Therefore, the first transistor TD charges the sensing line LSEN (i.e., the third capacitor C3). In other words, the voltage value of the detection signal SN is charged.

At the time point tp3, the voltage value of the detection signal SN is charged to a voltage value and will not rise again. At this time, the voltage value VG minus the voltage value of the detection signal SN is the threshold voltage value VTH of the first transistor TD. At the time point tp3, the voltage value of the sensing control signal SSEN is converted to the low voltage value. The voltage value of the switch signal SSW2 is the high voltage value. Therefore, the second conversion circuit 2113 receives the detection signal SN through the sensing line LSEN and the switch SW2, and converts the detection signal SN into the detection data DN.

At a time point tp4, the voltage values of the scanning signal SSCAN and the switch signal SSW2 are converted to the low voltage values. Therefore, both the second transistor TSC and the switch SW2 are turned off. The detection phase ends.

The controller 2111 receives the detection data DN. The voltage value VG is known. Therefore, the controller 2111 may obtain the threshold voltage value VTH of the first transistor TD according to the detection data DN and the voltage value VG, and generate the compensation data DC according to the threshold voltage value VTH of the first transistor TD.

For example, when the threshold voltage value VTH is larger, the controller 2111 uses the compensation data DC to increase the value of the driving data DD. Therefore, the voltage value of the driving signal SD will be increased. When the threshold voltage value VTH is smaller, the controller 2111 uses the compensation data DC to reduce the value of the driving data DD. Therefore, the voltage value of the driving signal SD will be reduced.

Figure 5:
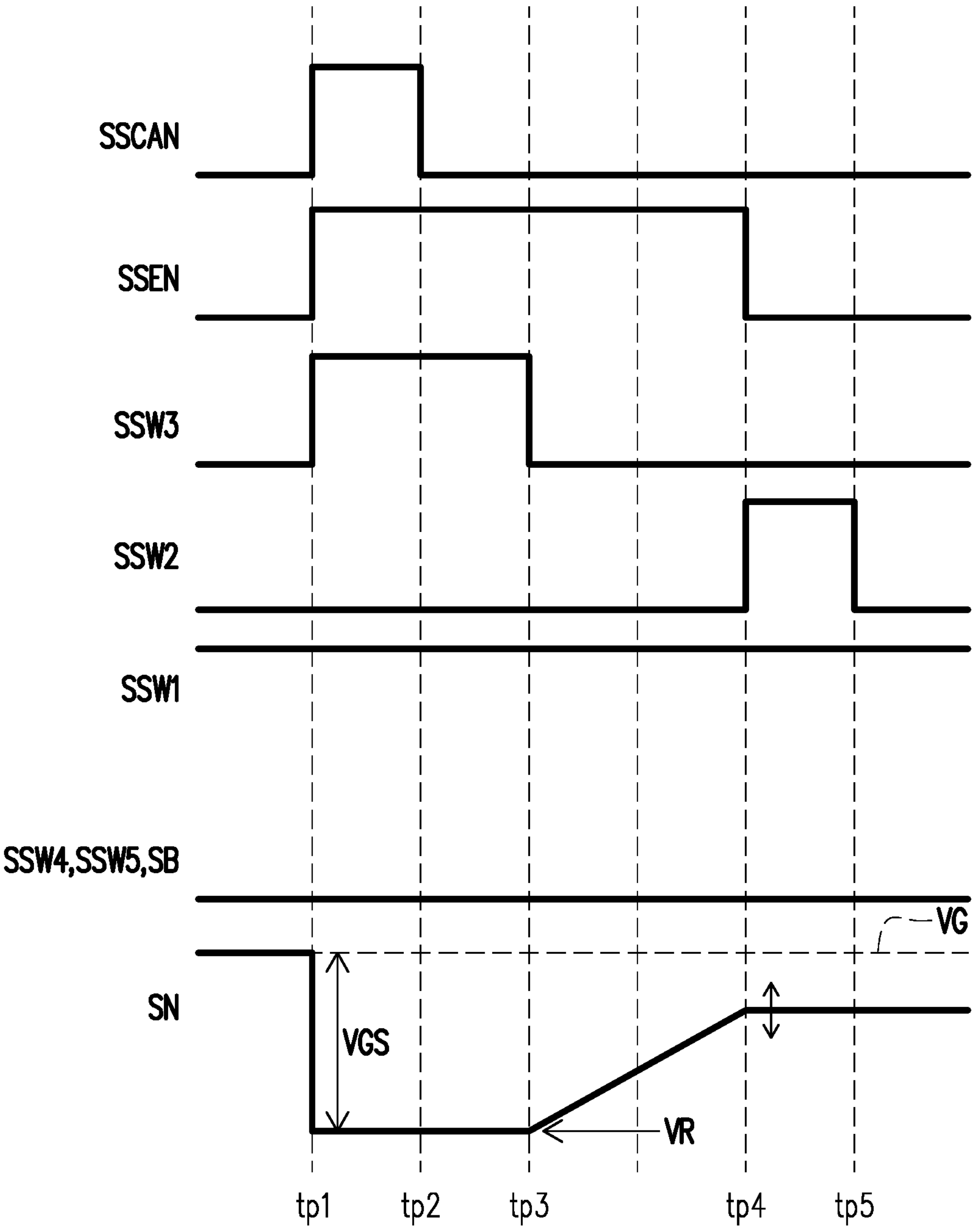
FIG. 5 is a timing diagram of a third operation in the detection phase according to FIG. 2.

Referring to both FIG. 2 and FIG. 5, FIG. 5 is a timing diagram of a third operation in the detection phase according to FIG. 2. This embodiment is suitable for obtaining mobility of the first transistor TD.

In this embodiment, the detection phase starts at the time point tp1. At the time point tp1, the voltage values of the scanning signal SSCAN, the sensing control signal SSEN, and the switch signals SSW1 and SSW3 are the high voltage values. Therefore, the second transistor TSC, the third transistor TSS, and the switches SW1 and SW3 are all turned on. The voltage values of the switch signals SSW2, SSW4, and SSW5 and the bias signal SB are the low voltage values. Therefore, the switches SW2, SW4, and SW5 and the fourth transistor TB are all turned off.

At this time, the first conversion circuit 2112 precharges the control end of the first transistor TD. The first conversion circuit 2112 precharges the voltage value at the control end of the first transistor TD to the voltage value VG. The voltage source 212 provides the constant voltage VR to the second end of the first transistor TD. The voltage value of the second end of the first transistor TD is substantially equal to the voltage value of the constant voltage VR. Therefore, there is a voltage difference VGS between the control end of the first transistor TD and the second end of the first transistor TD.

At the time point tp2, the voltage value of the scanning signal SSCAN is converted to the low voltage value. Therefore, the control end of the first transistor TD is in a floating state. Based on capacitive coupling of the first capacitor C1, even if the voltage value at the second end of the first transistor TD is changed, the voltage difference VGS is still maintained.

At the time point tp3, the voltage value of the switch signal SSW3 is converted to the low voltage value. The switch SW3 is turned off. Therefore, the first transistor TD provides a driving current value ID based on the voltage difference VGS, thereby charging the sensing line LSEN (i.e., charging the third capacitor C3). In other words, the voltage value of the detection signal SN is charged.

At the time point tp4, the voltage value of the sensing control signal SSEN is converted to the low voltage value. The third transistor TSS is turned off. Therefore, the first transistor TD no longer charges the voltage value of the detection signal SN. At this time, the voltage value of the switch signal SSW3 is converted to the high voltage value. Therefore, the second conversion circuit 2113 receives the detection signal SN through the sensing line LSEN and the switch SW2, and converts the detection signal SN into the detection data DN.

At a time point tp5, the voltage value of the switch signal SSW2 is converted to the low voltage value. Therefore, the switch SW2 is turned off. The detection phase ends.

The controller 2111 receives the detection data DN. It should be understood that the current value ID provided by the first transistor TD may be obtained from a capacitance value of the third capacitor C3 and a rising amount (i.e., a rising slope) of the voltage value of the detection signal SN between the time point tp3 and the time point tp4. For example, the current value ID is positively related to a product of the capacitance value of the third capacitor C3 and the rising slope. In addition, the voltage difference VGS, the threshold voltage value VTH of the first transistor TD, and a channel width length ratio of the first transistor TD (a channel size of the first transistor TD) are known. Therefore, the controller 2111 may calculate the mobility of the first transistor TD based on a current formula of a field effect transistor, and generate the compensation data DC according to the mobility of the first transistor TD.

For example, when the mobility of the first transistor TD is smaller, the controller 2111 uses the compensation data DC to increase the value of the driving data DD. Therefore, the voltage value of the driving signal SD will be increased. When the mobility of the first transistor TD is larger, the controller 2111 uses the compensation data DC to reduce the value of the driving data DD. Therefore, the voltage value of the driving signal SD will be reduced.

In this embodiment, the mobility of the first transistor TD obtained by the controller 2111 may be a relative value. In a case that the capacitance value of the third capacitor C3 and a time length between the time point tp3 and the time point tp4 are constant, the mobility of the first transistor TD is positively related to the voltage value of the detection signal SN at the time point tp4. The higher the voltage value of the detection signal SN at the time point tp4 is, the larger the mobility of the first transistor TD is. The lower the voltage value of the detection signal SN at the time point tp4 is, the smaller the mobility of the first transistor TD is.

In other words, the controller 2111 may compensate the voltage value of the driving signal SD according to a charging speed of the first transistor TD for charging the detection signal SN.

Figure 6:
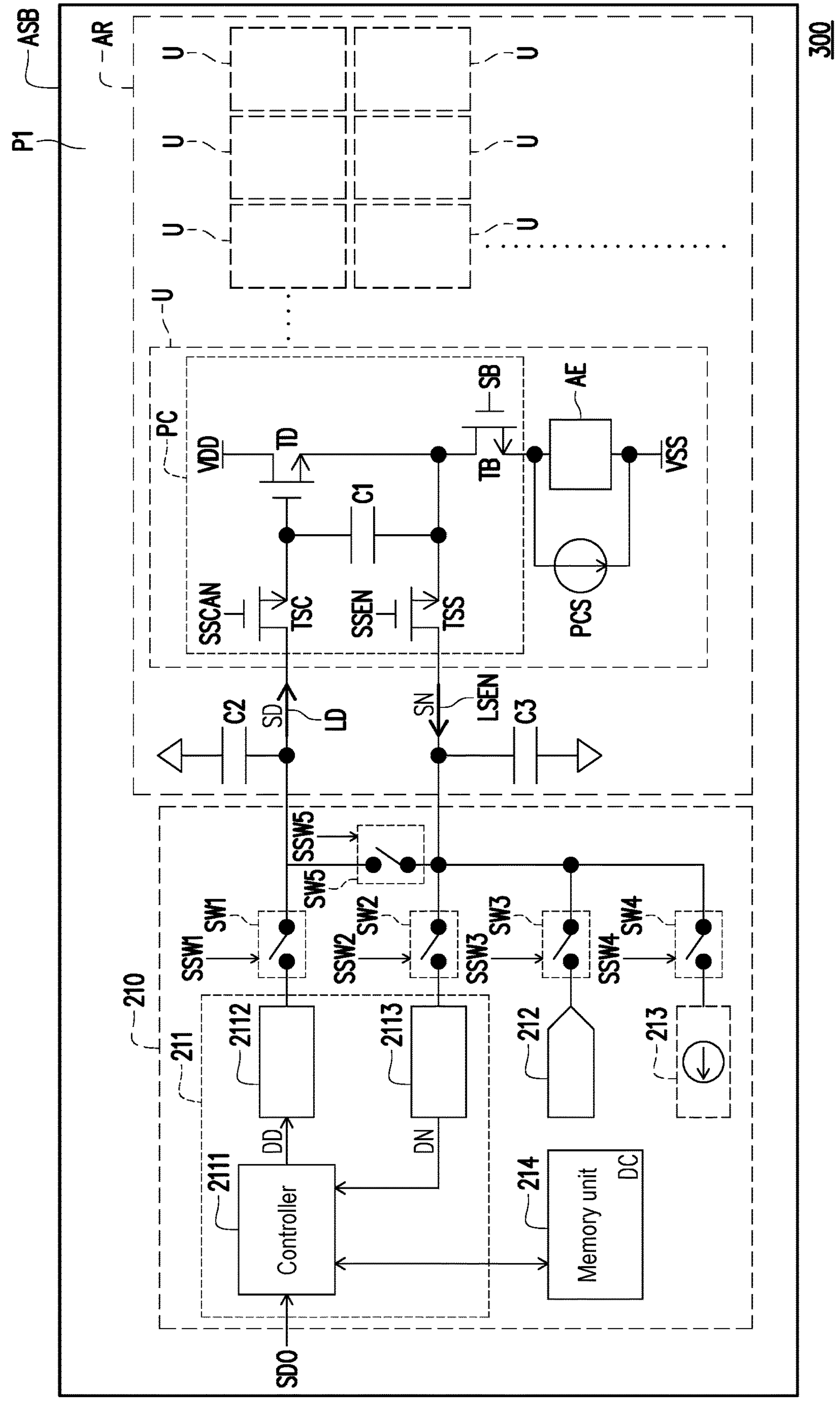
FIG. 6 is a schematic diagram of a modulating device according to the third embodiment of the disclosure.

Referring to FIG. 6, FIG. 6 is a schematic diagram of a modulating device according to the third embodiment of the disclosure. In this embodiment, a modulating device 300 includes the main substrate ASB, the modulating units U, and the compensation circuit 210. The compensation circuit 210 includes the driving unit 211, the voltage source 212, the current source 213, and the memory unit 214. One of the modulating units U includes the modulating element AE, the pixel circuit PC, and a pixel current source PCS. The pixel circuit PC is electrically connected to the modulating element AE. In this embodiment, implementations of the pixel circuit PC, the modulating element AE, and the compensation circuit 210 have been clearly described in the embodiments of FIG. 2 to FIG. 5. Therefore, the same details will not be repeated in the following.

In this embodiment, a first end of the pixel current source PCS is electrically connected to the first end of the modulating element AE and the pixel circuit PC. A second end of the pixel current source PCS is electrically connected to the second end of the modulating element AE. The pixel current source PCS is configured to increase a discharge speed at the first end of the modulating element AE. In this way, in the operation phase, a time length of a frame of the modulating device 300 may be shortened. A frame rate of the modulating device 300 may be increased.

Figure 7:
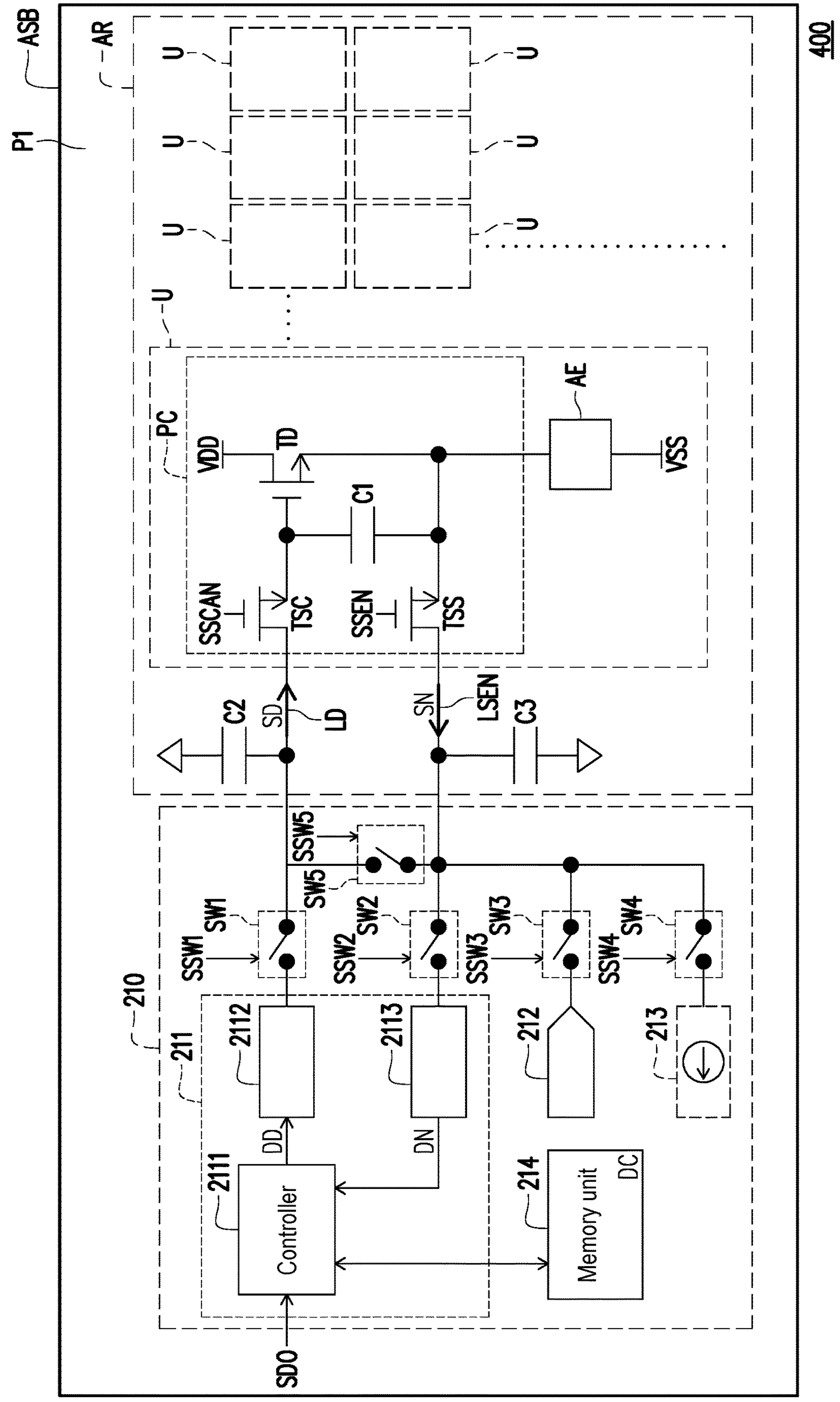
FIG. 7 is a schematic diagram of a modulating device according to the fourth embodiment of the disclosure.

Referring to FIG. 7, FIG. 7 is a schematic diagram of a modulating device according to the fourth embodiment of the disclosure. In this embodiment, a modulating device 400 includes the main substrate ASB, the modulating units U, and the compensation circuit 210. The compensation circuit 210 includes the driving unit 211, the voltage source 212, the current source 213, and the memory unit 214. One of the modulating units U includes the modulating element AE and the pixel circuit PC. The pixel circuit PC is electrically connected to the modulating element AE. In this embodiment, the first end of the modulating element AE is electrically connected to the pixel circuit PC. The second end of the modulating element AE is electrically connected to the reference low voltage VSS.

The pixel circuit PC includes the first transistor TD, the second transistor TSC, the third transistor TSS, and the first capacitor C1. The first end of the first transistor TD is electrically connected to the reference high voltage value VDD. The second end of the first transistor TD is electrically connected to the modulating element AE. The first end of the second transistor TSC is electrically connected to the driving unit 211. The second end of the second transistor TSC is electrically connected to the control end of the first transistor TD. The control end of the second transistor TSC receives the scanning signal SSCAN. The first end of the third transistor TSS is electrically connected to the driving unit 211. The second end of the third transistor TSS is electrically connected to the second end of the first transistor TD. The control end of the third transistor TSS receives the sensing control signal SSEN. In addition, the first capacitor C1 is electrically connected between the second end of the second transistor TSC and the second end of the third transistor TSS.

In this embodiment, the compensation circuit 210 obtains the forward bias value VF of the modulating element AE. An implementation of the compensation circuit 210 to obtain the forward bias value VF of the modulating element AE has been clearly described in the embodiments of FIG. 2 and FIG. 3. Therefore, the same details will not be repeated in the following.

In some embodiments, the first transistor TD, the second transistor TSC, the third transistor TSS, and the first capacitor C1 may be manufactured or integrated on a chip. The chip can be disposed on the main substrate ASB to be correspondingly connected to the modulating element AE.

Figure 8:
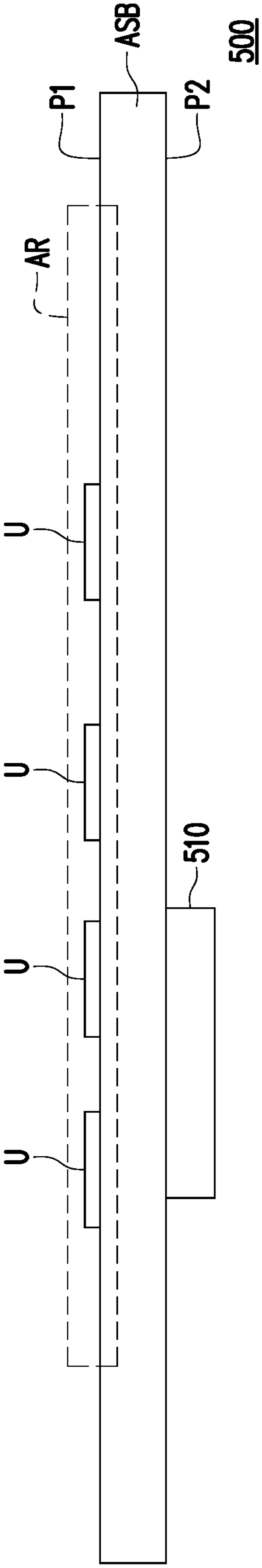
FIG. 8 is a schematic diagram of a modulating device according to the fifth embodiment of the disclosure.

Referring to FIG. 8, FIG. 8 is a schematic diagram of a modulating device according to the fifth embodiment of the disclosure. In this embodiment, a modulating device 500 includes the main substrate ASB, the modulating units U, and a compensation circuit 510. The main substrate ASB has the first surface P1 and a second surface P2. The first surface P1 and the second surface P2 are opposite to each other. The modulating units U are disposed in the actuation region AR of the first surface P1. The compensation circuit 510 is disposed on the second surface P2. In this embodiment, the compensation circuit 510 may be electrically connected to the modulating units U through a conductive via structure or an interconnection structure of the main substrate ASB.

In this embodiment, the compensation circuit 510 may be implemented by the compensation circuit 110 shown in FIG. 1 or the compensation circuit 210 shown in FIG. 2.

Figure 9:
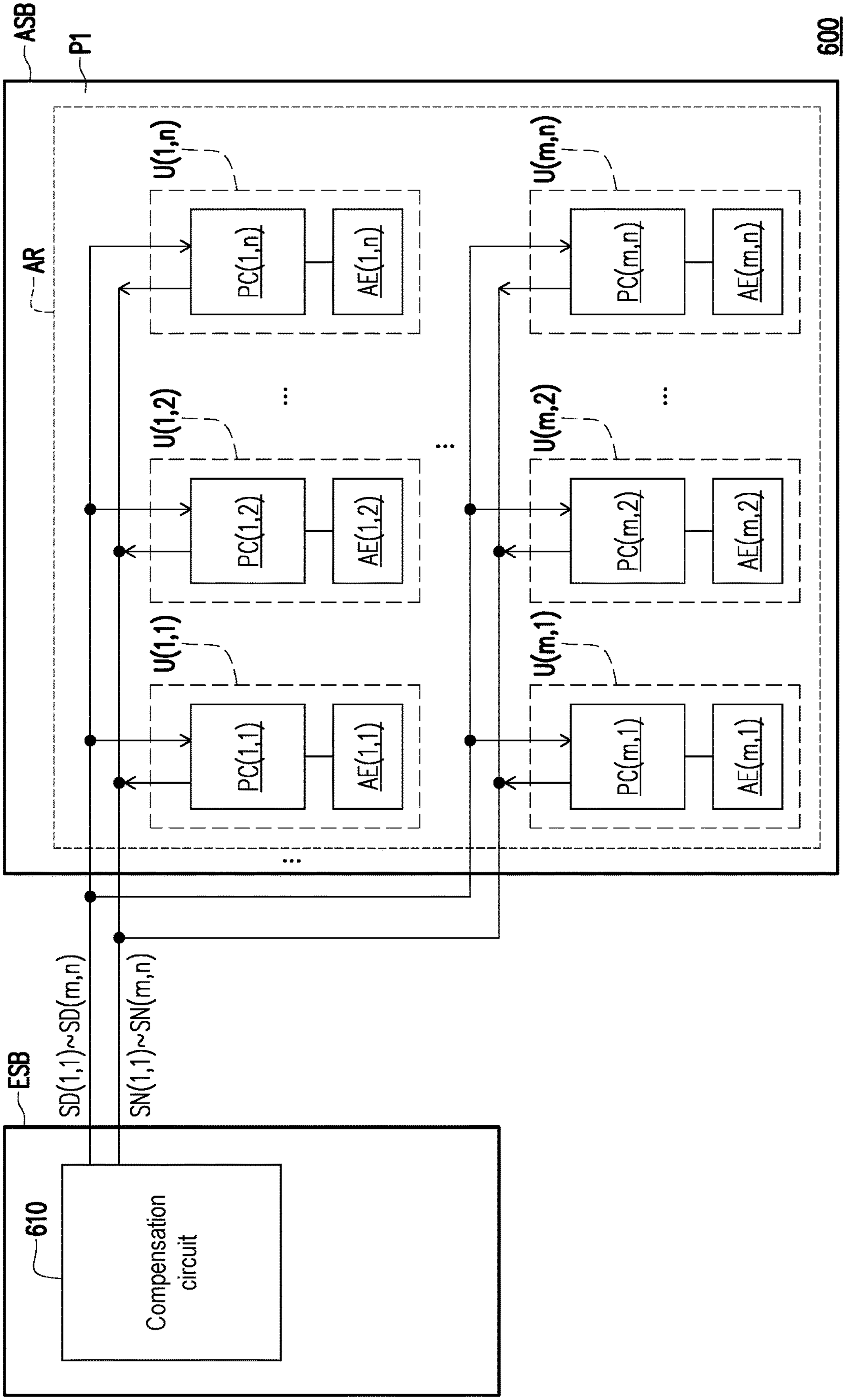
FIG. 9 is a schematic diagram of a modulating device according to the sixth embodiment of the disclosure.

Referring to FIG. 9, FIG. 9 is a schematic diagram of a modulating device according to the sixth embodiment of the disclosure. In this embodiment, a modulating device 600 includes an external substrate ESB, the main substrate ASB, the modulating units U, and a compensation circuit 610. The modulating units U are disposed in the actuation region AR of the first surface P1. The compensation circuit 610 is disposed on the external substrate ESB. In this embodiment, the external substrate ESB may be a printed circuit board (PCB), a flexible printed circuit (FPC) board, or a hard substrate well known to those skilled in the art. The compensation circuit 610 may be packaged in the external substrate ESB in a manner of chip on film (COF).

In this embodiment, the compensation circuit 610 may be implemented by the compensation circuit 110 shown in FIG. 1 or the compensation circuit 210 shown in FIG. 2.

Based on the above, the driving unit of the compensation circuit 110 compensates the driving signal according to the electronic properties of the pixel circuit and the electronic properties of the modulating element. Based on the above compensation, the difference in the above electronic properties may be eliminated. The operation performance of the modulating element may be more consistent. In this way, the operation uniformity of the modulating element may be improved.

Lastly, it is to be noted that: the embodiments described above are only used to illustrate the technical solutions of the disclosure, and not to limit the disclosure; although the disclosure is described in detail with reference to the embodiments, those skilled in the art should understand: it is still possible to modify the technical solutions recorded in the embodiments, or to equivalently replace some or all of the technical features; the modifications or replacements do not cause the essence of the corresponding technical solutions to deviate from the scope of the technical solutions of the embodiments.

What is claimed is:

1. A modulating device, comprising:

a main substrate having a first surface, wherein the first surface comprises an actuation region;

a plurality of modulating elements disposed in the actuation region;

a plurality of pixel circuits disposed in the actuation region and electrically connected to the modulating elements correspondingly; and a compensation circuit electrically connected to the pixel circuits, comprising:

a driving unit configured to provide a driving signal to the pixel circuits;

a voltage source electrically connected to the driving unit and configured to provide a constant voltage to the pixel circuits; and a current source electrically connected to the driving unit and configured to provide a constant current to the pixel circuits, wherein a first pixel circuit of the pixel circuits comprises:

a first transistor, wherein a first end of the first transistor is electrically connected to a reference high voltage, and a second end of the first transistor is electrically connected to a first modulating element of the modulating elements;

a second transistor, wherein a first end of the second transistor is electrically connected to the driving unit, a second end of the second transistor is electrically connected to a control end of the first transistor, and a control end of the second transistor receives a scanning signal;

a third transistor, wherein a first end of the third transistor is electrically connected to the driving unit, a second end of the third transistor is electrically connected to the second end of the first transistor, and a control end of the third transistor receives a sensing control signal; and a first capacitor electrically connected between the second end of the second transistor and the second end of the third transistor.

2. The modulating device according to claim 1, wherein the driving unit comprises:

a controller;

a first conversion circuit, wherein an input end of the first conversion circuit is electrically connected to the controller, and an output end of the first conversion circuit is electrically connected to the first end of the second transistor through a data line; and a second conversion circuit, wherein an output end of the second conversion circuit is electrically connected to the controller, and an input end of the second conversion circuit is electrically connected to the first end of the third transistor through a sensing line.

3. The modulating device according to claim 2, wherein the controller generates driving data, and the first conversion circuit converts the driving data into the driving signal, and provides the driving signal to the data line.

4. The modulating device according to claim 2, wherein the first conversion circuit is implemented by a digital-to-analog converter.

5. The modulating device according to claim 2, wherein the compensation circuit further comprises:

a first switch, wherein a first end of the first switch is electrically connected to the output end of the first conversion circuit, a second end of the first switch is electrically connected to the data line, and a control end of the first switch receives a first switch signal.

6. The modulating device according to claim 2, wherein the compensation circuit further comprises:

a second switch, wherein a first end of the second switch is electrically connected to the input end of the second conversion circuit, a second end of the second switch is electrically connected to the sensing line, and a control end of the second switch receives a second switch signal.

7. The modulating device according to claim 2, wherein the compensation circuit further comprises:

a third switch, wherein a first end of the third switch is electrically connected to an output end of the voltage source, a second end of the third switch is electrically connected to the sensing line, and a control end of the third switch receives a third switch signal.

8. The modulating device according to claim 2, wherein the compensation circuit further comprises:

a fourth switch, wherein a first end of the fourth switch is electrically connected to an output end of the current source, a second end of the fourth switch is electrically connected to the sensing line, and a control end of the fourth switch receives a fourth switch signal.

9. The modulating device according to claim 2, wherein the compensation circuit further comprises:

a fifth switch, wherein a first end of the fifth switch is electrically connected to the data line, a second end of the fifth switch is electrically connected to the sensing line, and a control end of the fifth switch receives a fifth switch signal.

10. The modulating device according to claim 2, wherein the compensation circuit further comprises:

a memory unit electrically connected to the controller.

11. The modulating device according to claim 10, wherein the second conversion circuit receives a detection signal through the sensing line, converts the detection signal into detection data, and provides the detection data to the controller, and the controller generates compensation data according to the detection data, and stores the compensation data into the memory unit.

12. The modulating device according to claim 11, wherein the first conversion circuit is implemented by an analog-to-digital converter.

13. The modulating device according to claim 10, wherein the memory unit provides previously stored compensation data to the controller.

14. The modulating device according to claim 13, wherein the controller uses the compensation data to compensate driving data.

15. The modulating device according to claim 1, wherein a first end of a first modulating element of the modulating elements is electrically connected to a first pixel circuit of the pixel circuits, and a second end of the first modulating element is electrically connected to a reference low voltage value.

16. The modulating device according to claim 15, wherein the first end of the first modulating element is a cathode, and the second end of the first modulating element is an anode.

17. The modulating device according to claim 1, wherein the main substrate further has a second surface, the second surface is opposite to the first surface, and the compensation circuit is disposed on the second surface.

18. The modulating device according to claim 1, wherein the compensation circuit is disposed on the first surface and outside the actuation region.

19. The modulating device according to claim 1, further comprising:

an external substrate, wherein the compensation circuit is disposed on the external substrate.

* * * * *